United States Patent
Clay et al.

(10) Patent No.: US 11,106,435 B1
(45) Date of Patent: Aug. 31, 2021

(54) OPC UA SERVER, SYSTEM OPERATING USING OPC UA, AND METHOD OF EXECUTING OPC UA SYSTEM

(71) Applicant: YOKOGAWA ELECTRIC CORPORATION, Tokyo (JP)

(72) Inventors: Patrick Clay, Sugar Land, TX (US); Vien Nguyen, Sugar Land, TX (US)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/790,170

(22) Filed: Feb. 13, 2020

(51) Int. Cl.
G06F 8/30 (2018.01)

(52) U.S. Cl.
CPC .................................. G06F 8/31 (2013.01)

(58) Field of Classification Search
CPC ........................................................ G06F 8/31
USPC .................................................... 717/124–167
See application file for complete search history.

(56) References Cited

U.S. PATENT DOCUMENTS

| | | | | |
|---|---|---|---|---|
| 8,423,608 | B2* | 4/2013 | Mahnke | H04L 12/403 709/203 |
| 9,854,027 | B2* | 12/2017 | Volkmann | G06F 9/542 |
| 10,812,577 | B2* | 10/2020 | Asikainen | H04L 67/1004 |
| 2006/0053415 | A1 | 3/2006 | Okmianski | |
| 2010/0211197 | A1* | 8/2010 | Balentine | G05B 19/41845 700/87 |
| 2014/0040431 | A1* | 2/2014 | Rao | G06F 16/2282 709/219 |
| 2015/0012912 | A1* | 1/2015 | Cheriton | G06F 8/427 717/139 |
| 2018/0088548 | A1* | 3/2018 | Sangi | H04W 4/70 |

OTHER PUBLICATIONS

Handley, Mark, Orion Hodson, and Eddie Kohler. "XORP: An open platform for network research." ACM SIGCOMM Computer Communication Review 33.1 (2003): pp. 53-57. (Year: 2003).*
Lockwood, John W., et al. "NetFPGA—an open platform for gigabit-rate network switching and routing." 2007 IEEE International Conference on Microelectronic Systems Education (MSE'07). IEEE, 2007.pp. 1-2 (Year: 2007).*
Nikravesh, Ashkan, et al. "Mobilyzer: An open platform for controllable mobile network measurements." Proceedings of the 13th Annual International Conference on Mobile Systems, Applications, and Services. 2015.pp. 389-404 (Year: 2015).*
Ierusalimschy, Roberto, Luiz Henrique De Figueiredo, and Waldemar Celes Filho. "The Implementation of Lua 5.0." J. UCS 11.7 (2005): pp. 1159-1176. (Year: 2005).*
Utke, Jean, et al. "OpenAD/F: A modular open-source tool for automatic differentiation of Fortran codes." ACM Transactions on Mathematical Software (TOMS) 34.4 (2008): pp. 1-36. (Year: 2008).*

(Continued)

*Primary Examiner* — Satish Rampuria
(74) *Attorney, Agent, or Firm* — Osha Bergman Watanabe & Burton LLP (57) ABSTRACT

An Open Platform Communications (OPC) Unified Architecture (UA) server includes: a storage that stores a configuration file written in a compiled programming language and in which an interpreter is embedded; a transceiver that receives, from an OPC UA client, an execution request to execute a calculation defined in the configuration file; and a processor that executes the calculation using the interpreter.

12 Claims, 11 Drawing Sheets

(56) References Cited

OTHER PUBLICATIONS

Bohli, Jens-Matthias, et al. "Security enhanced multi-hop over the air reprogramming with fountain codes." 2009 IEEE 34th Conference on local computer networks. IEEE, 2009.pp. 850-857 (Year: 2009).*

Sun, Xiaole, and Ivan B. Djordjevic. "FPGA implementation of rate-adaptive spatially coupled LDPC codes suitable for optical communications." Optics express 27.3 (2019): pp. 3422-3428. (Year: 2019).*

* cited by examiner

```
{
    "Name" : "MyCalc",
    "ArgsIn" :
    [
        {
            "Name" : "A",
            "DataType" : "INT"
        },
        {
            "Name" : "B",
            "DataType" : "INT"
        }
    ],
    "ArgsOut" :
    [
        "Name" : "SUM",
        "DataType" : "INT"
    ],
    "Algorithm": "SUM=A+B"
}
```

```
{
    "Name" : "Average3",
    "ArgsIn" :
    {
        {
            "Name" : "Val1",
            "DataType" : "DOUBLE"
        },
        {
            "Name" : "Val2",
            "DataType" : "DOUBLE"
        },
        {
            "Name" : "Val3",
            "DataType" : "DOUBLE"
        }
    },
    "ArgsOut" :
    {
        "Name" : "AVERAGE",
        "DataType" : "DOUBLE"
    },
    "Algorithm": "AVERAGE=(Val1+Val2+Val3)/2.0"
}
```

```
{
    "Name" : "Average3",
    "ArgsIn" :
    [
        {
            "Name" : "Val1",
            "DataType" : "DOUBLE"
        },
        {
            "Name" : "Val2",
            "DataType" : "DOUBLE"
        },
        {
            "Name" : "Val3",
            "DataType" : "DOUBLE"
        }
    ],
    "ArgsOut" :
    [
        "Name" : "AVERAGE",
        "DataType" : "DOUBLE"
    ],
    "Algorithm": "AVERAGE=(Val1+Val2+Val3)/3.0"
}
```

OPC UA SERVER, SYSTEM OPERATING USING OPC UA, AND METHOD OF EXECUTING OPC UA SYSTEM

BACKGROUND

An Open Platform Communications (OPC) Unified Architecture (UA) is a platform-independent service-oriented architecture that provides the necessary infrastructure for interoperability across the enterprise including: machine-to-machine communication, machine-to-enterprise communication, and everything else in between.

Generally, an OPC UA system includes OPC UA clients and OPC UA servers. The OPC UA server executes an OPC UA server application program based on a request message from the OPC UA client. In conventional OPC UA systems, the OPC UA server application program is provided by vendors and written in compiled programming languages such as C++. The compiled programming languages use a compiler, which is a program that converts source code into machine code. When a compilation process by the compiler is finished, the converted program can be executed without need of the original source code. If a change is made to the OPC UA server program, all the source code must be edited and the compilation process must be re-run to create new machine code.

Programs written in the compiled programming languages are unable to be modified without access to all the source code and the ability to re-compile the program. However, the user of the OPC UA server may not own all the source code of the OPC UA server program. Furthermore, a highly specialized skillset is required to make any changes to the source code. Accordingly, even if the user wishes to make changes or add new functionality to the OPC UA server program, the user may not be able to easily modify the OPC UA server program, which may require the user to request a professional programmer or vendor to get a new server compiled and built. As a result, the user may expend considerable time and money to modify the OPC UA server program.

SUMMARY

An OPC UA server according to one or more embodiments includes: a storage that stores a configuration file written in a compiled programming language and in which an interpreter is embedded; a transceiver that receives, from an OPC UA client, an execution request to execute a calculation defined in the configuration file; and a processor that executes the calculation using the interpreter.

A system according to one or more embodiments operates using OPC UA. The system includes: an OPC UA server that stores a configuration file written in a compiled programming language and in which an interpreter is embedded; and an OPC UA client that sends the OPC UA server an execution request to execute a calculation defined in the configuration file. The OPC UA server executes the calculation using the interpreter upon receiving the execution request.

A method of executing an Open Platform Communications (OPC) Unified Architecture (UA) system according to one or more embodiments includes: storing, with an OPC UA server, a configuration file written in a compiled programming language and in which an interpreter is embedded; sending, from an OPC UA client to the OPC UA server, an execution request to execute a calculation defined in the OPC UA configuration file; receiving, with the OPC UA server, the execution request; and executing, with the OPC UA server, the calculation using the interpreter upon receiving the execution request.

One or more embodiments makes it possible to modify a configuration file written in a compiled programming language used in the OPC UA system more easily and execute the OPC UA program without compiling the configuration file.

DETAILED DESCRIPTION

Embodiments of the present invention will be described in detail below with reference to the drawings. Like elements in the various figures are denoted by like reference numerals for consistency.

In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
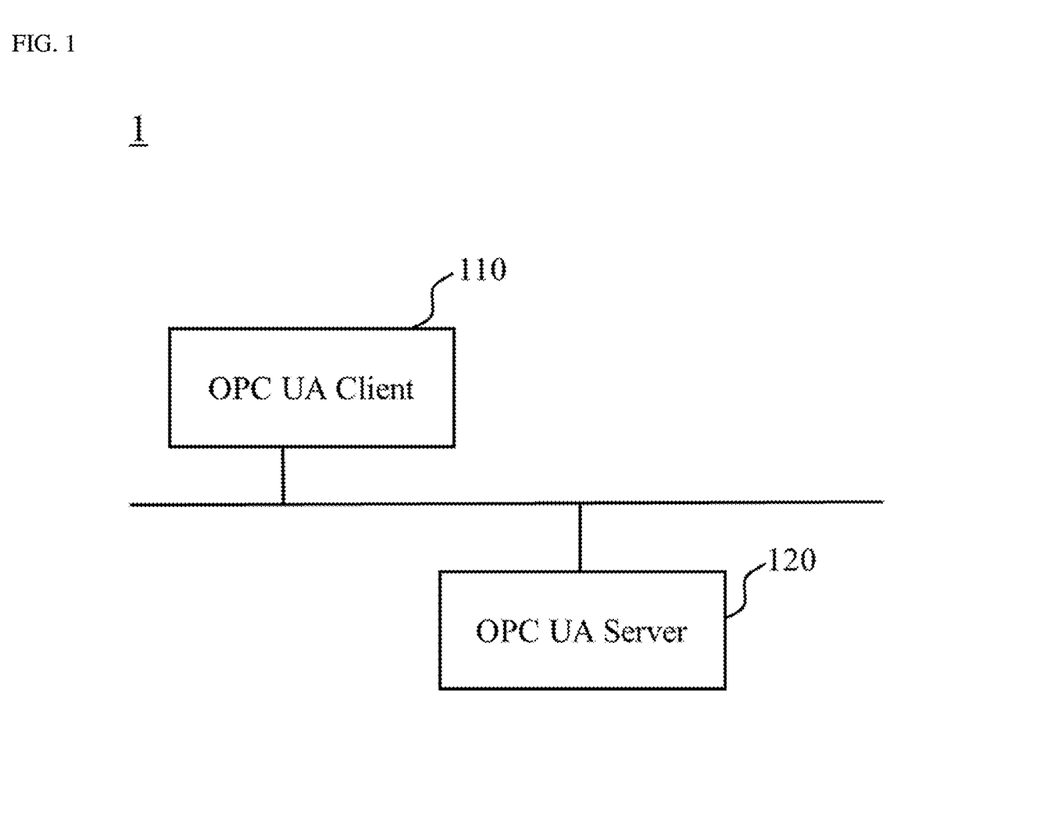
FIG. 1 shows an OPC Unified Architecture (UA) system according to one or more embodiments.

FIG. 1 shows an OPC UA system 1 according to one or more embodiments. The OPC UA system 1 includes an OPC UA client 110 and an OPC UA server 120. The OPC UA client 110 is connected to the OPC UA server 120 via an OPC UA network. The OPC UA system 1 may include a plurality of OPC UA clients 110 and OPC UA servers 120.

The OPC UA client 110 is a client computer in the OPC UA system 1. The OPC UA client 110 includes a software application that sends messages to the OPC UA server 120. The messages may be data units conveyed between the OPC UA client 110 and the OPC UA server 120 that represent a predetermined service request or response. The OPC UA client 110 is used to define one or more calculations executed by the OPC UA server 120. Each calculation defined by the user has a name.

The OPC UA server 120 is a server endpoint of client/server interactions. The OPC UA server 120 includes a software application that implements and exposes predetermined services. The OPC UA server 120 includes one or more calculations to be executed based on a request from the OPC UA client 110.

The OPC UA client 120 may have functions of the OPC UA server 120 and vice versa.

Next, hardware configurations of the OPC UA client 110 and the OPC UA server 120 will be described.

Figure 2:
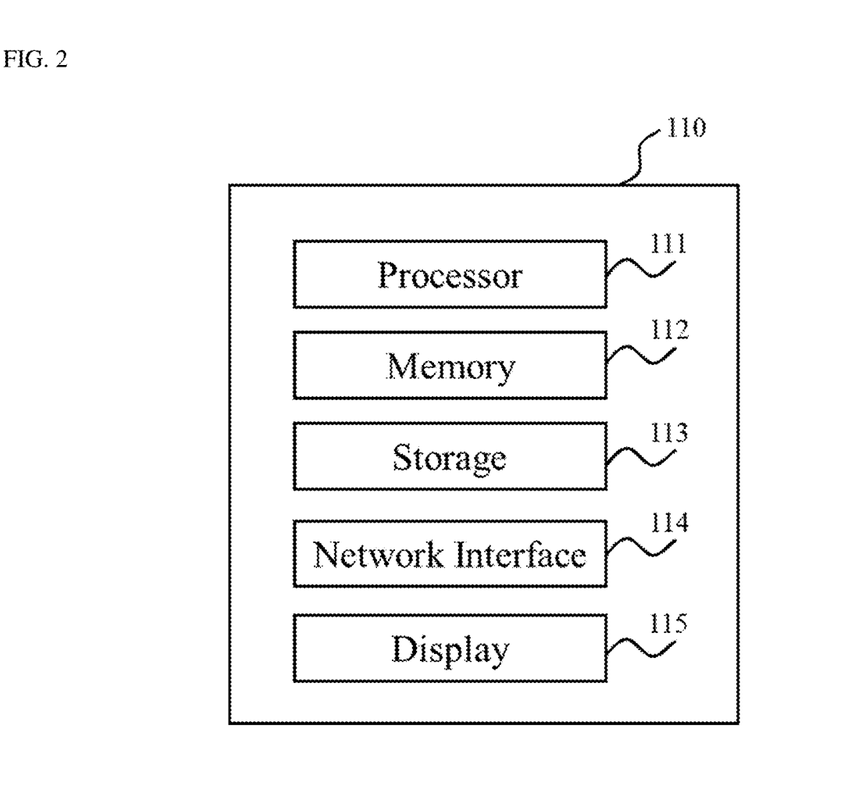
FIG. 2 shows a hardware diagram of an OPC UA client according to one or more embodiments.

FIG. 2 shows a hardware diagram of the OPC UA client 110 according to one or more embodiments. As shown in FIG. 2, the OPC UA client 110 includes at least one processor (e.g., a central processing unit (CPU)) 111, a memory 112 that communicates with the processor 111, a storage 113, a network interface 114, and a display 115. The processor 111 executes programs stored in the memory 112. The storage 113 is a non-transitory computer readable storage medium. The storage 113 may be a hard disk drive (HDD) or a solid-state drive (SSD). The network interface 114 transmits and receives messages (data, signals) and may be at least one of a Local Area Network (LAN) interface, a wireless LAN interface, or a cellular network interface such as Long Term Evolution (LTE) or New Radio (NR) (5G). The display 115 displays information based on instructions from the processor 111.

Figure 3:
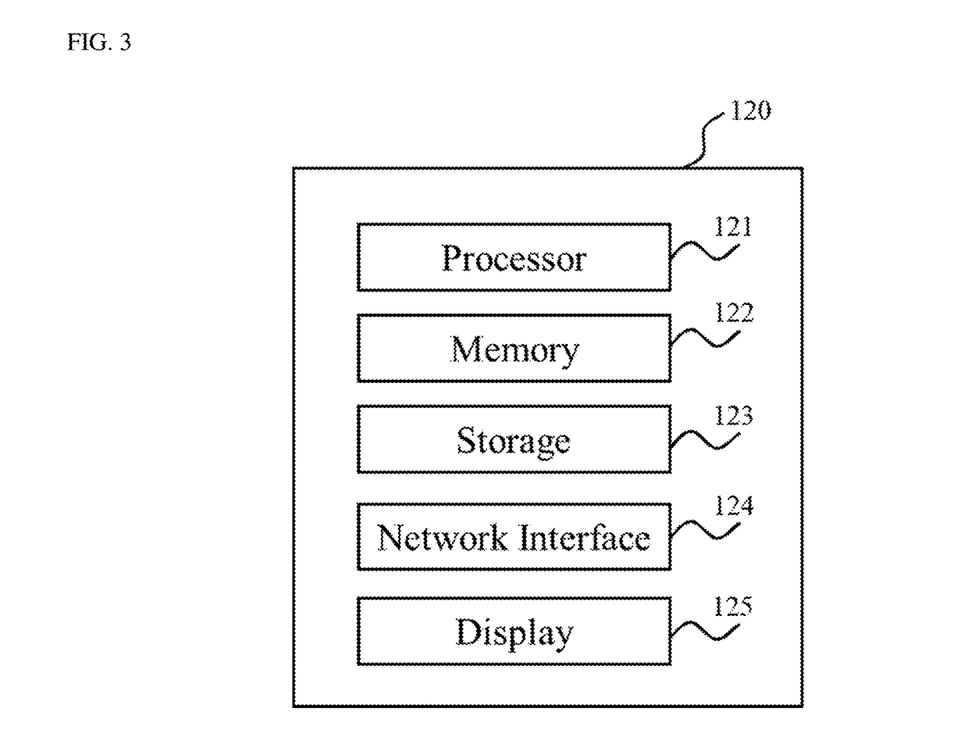
FIG. 3 shows a hardware diagram of an OPC UA server according to one or more embodiments.

FIG. 3 shows a hardware diagram of the OPC UA server 120 according to one or more embodiments. As shown in FIG. 3, the OPC UA server 120 includes at least one processor 121 (e.g., a CPU), a memory 122, a storage 123, and a network interface 124. The processor 121 executes programs stored in the memory 122. The storage 123 is a non-transitory computer readable storage medium and may be referred to as a disk. The network interface 124 transmits and receives messages and may be at least one of a LAN interface, a wireless LAN interface, or a cellular network interface such as LTE or NR (5G). Each of the OPC UA server 120 may include a display 125. The network interface 124 may be referred to as a transceiver. In one or more embodiments, information stored in the memory 122 may be stored in the storage 123 and vice versa.

Figure 4:
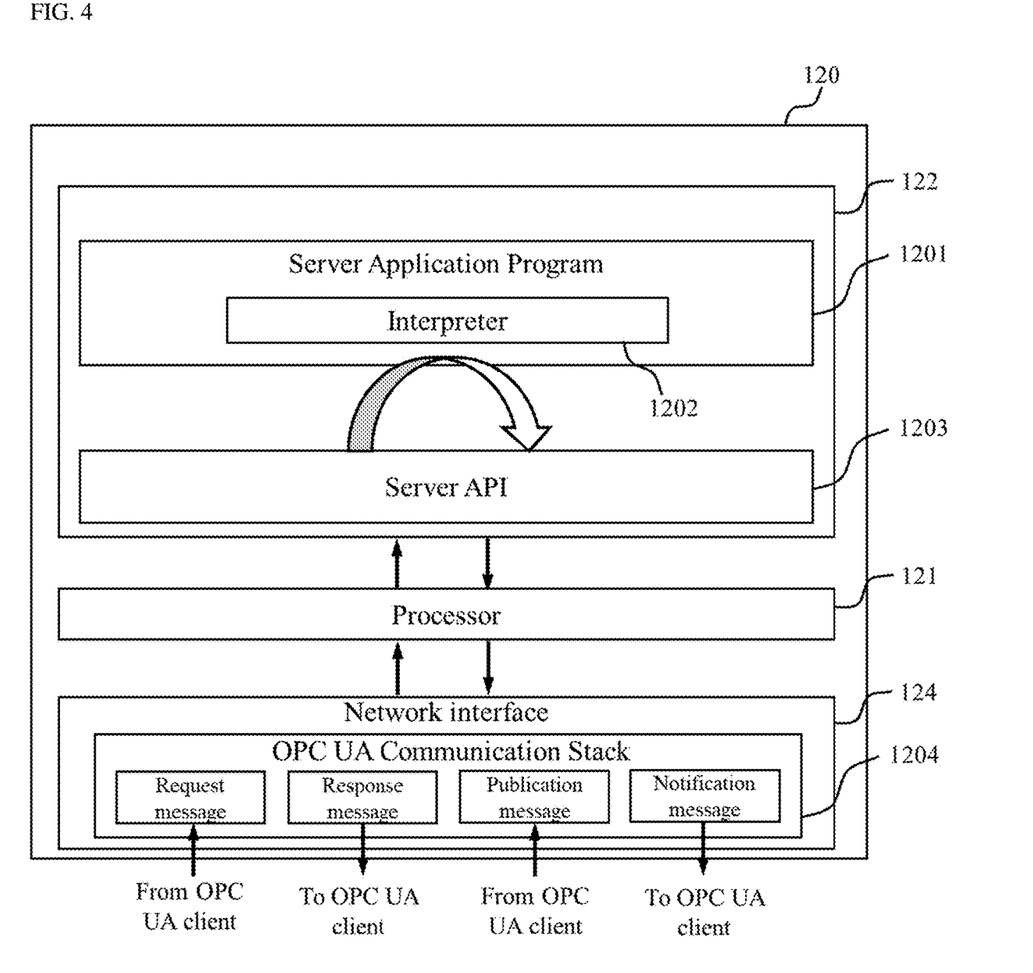
FIG. 4 shows a diagram of an OPC UA server architecture according to one or more embodiments.

Next, an architecture of the OPC UA server 120 will be described. FIG. 4 shows a diagram of the OPC UA server architecture according to one or more embodiments.

As shown in FIG. 4, the memory 122 stores a server application program 1201 in which an interpreter 1202 is embedded, and a server Application Programming Interface (API) 1203.

The server application program 1201 is a code that implements the function of the OPC UA server 120. The server application program 1201 uses the server API to send and receive OPC UA messages to/from the OPC UA client 110. The server API is an internal interface that isolates the server application program 1201 from an OPC UA communication stack 1204 included in the network interface 124. The server application program 1201 may be defined by a configuration file to be executed based on a request from the OPC UA client 110. The server application program 1201 may be an OPC UA application program.

The OPC UA communication stack 1204 receives a request message and publication message from the OPC UA client 110. The OPC UA communication stack 1204 sends a response message and a notification message to the OPC UA client 110.

The server application program 1201 is written in a compiled programming language such as a C++, Fortran, and COBOL, which uses a compiler that converts source code into machine code. The compiled programming language is not limited to the above examples and may be a predetermined programming language. The server application program 1201 may be referred to as a control strategy.

The interpreter 1202 may be a Lua scripting engine. Lua is a embeddable scripting language. The interpreter 1202 converts source code of the server application program 120 line by line into a machine code on-the-fly during run time. The interpreter 1202 may be referred to as a Lua interpreter 1202. As another example, the interpreter 1202 may be a program written in JavaScript. The interpreter 1202 is not limited to the above examples and may be a predetermined interpreter 1202.

By embedding an interpreter 1202 into the OPC UA server 120, the end user can define and run calculations using the interpreter 1202, such that the compiled OPC UA server in which the interpreter 1202 is hosted need not be modified.

One or more embodiments of the invention make it possible to flexibly modify the server application program 1201 and add the function to the server application program 1201 using the embedded interpreter 1202 without changing all of the source code of the server application program 1201.

Examples of methods of configuring a calculation, modifying a configuration file, and running the calculation will be described below.

(Configuring Calculation)

Figure 5:
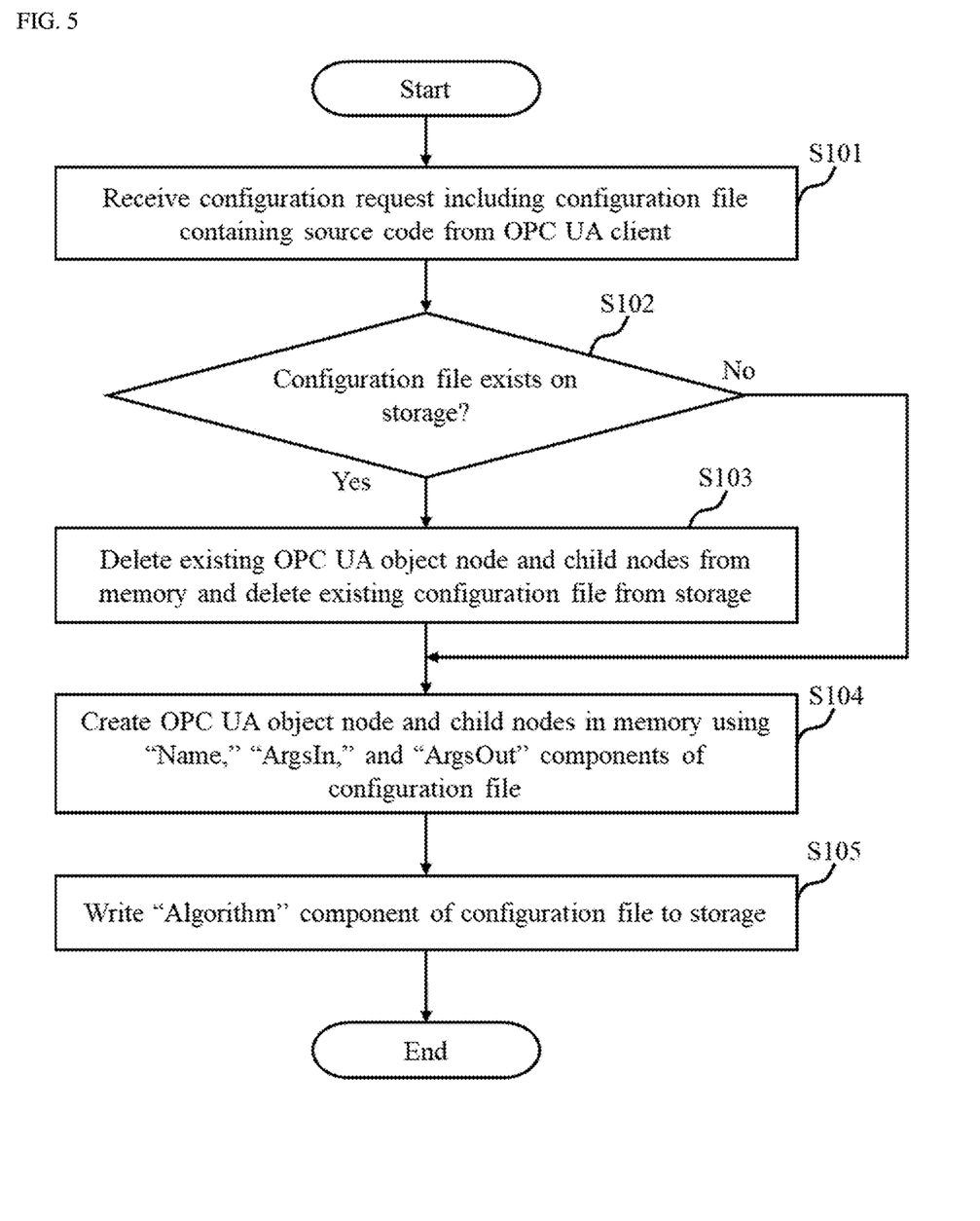
FIG. 5 shows a flowchart of configuring a calculation in the OPC UA server according to one or more embodiments.

FIG. 5 shows a flowchart of configuring a calculation in the OPC UA server 120 according to one or more embodiments.

At step S101 of FIG. 5, the OPC UA server 120 receives a configuration request including a configuration file from the OPC UA client 110 via a network. The configuration request may be formatted in any format.

Figure 6:
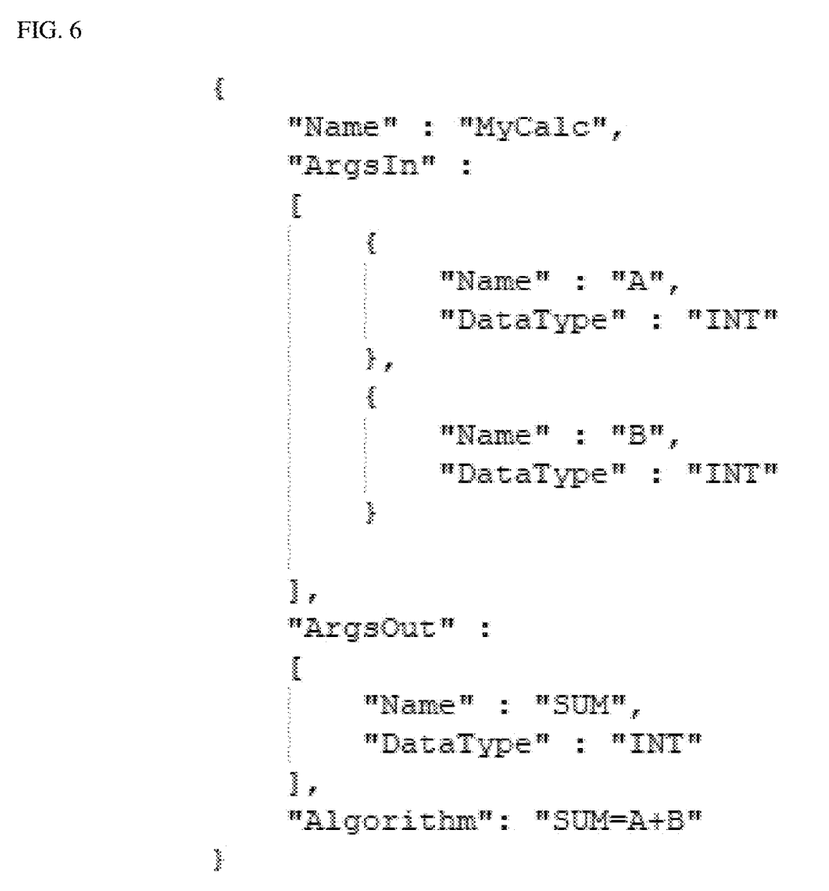
FIG. 6 shows an example of a configuration file according to one or more embodiments.

The configuration file contains source code indicating a configuration of a calculation. The configuration file may include a name for the calculation, the number of inputs for the calculation and a data type for each input, the number of outputs of the calculation and a data type for each output, and the algorithm of the calculation written in plaintext code for an interpreter 1202. FIG. 6 is an example of the source code contained in the configuration request. In FIG. 6, the name for the calculation is "MyCalc," the data type for each of inputs "A" and "B" is "INT," the data type for output "SUM" is "INT," and the algorithm is "SUM=A+B."

At step S102 of FIG. 5, when the OPC UA server 120 receives the configuration request, the processor 121 of the OPC UA server 120 determines if a configuration file exists on the storage 123.

If the determination at step S102 is yes, the OPC UA server 120 deletes an OPC UA object node and child nodes from the memory 122 and deletes existing configuration file from the storage 123 at step S103.

If the determination is at step S102 is no, an operation of step S104 is performed.

At step S104, the processor 121 reads the configuration file in the configuration request and creates an OPC UA node and child nodes in the memory 122 using "Name," "ArgsIn," and "ArgsOut" components of configuration file.

At step S105, the processor 121 writes the "Algorithm" component of the configuration file to the storage 123.

For example, when the OPC UA server 120 reads the configuration file of FIG. 6, the OPC UA server 120 performs the following steps:

creation of an OPC UA object node named "MyCalc" in an address space in the memory 122;

creation of an OPC UA folder node named "Inputs" as a child of "MyCalc";

creation of an OPC UA node as a child of the node "Inputs" for input argument "A" using the data type integer that has read/write permissions;

creation of an OPC UA node as a child of the node "Inputs" for input argument "B" using the data type integer that has read/write permissions;

creation of an OPC UA folder node named "Outputs" as a child of "MyCalc";

creation of an OPC UA node as a child of the node "Outputs" for output argument "C" using the data type integer that has read only permissions; and creation of an OPC UA node as a child of the node "MyCalc" for a method named "runCalc."

Figure 7:
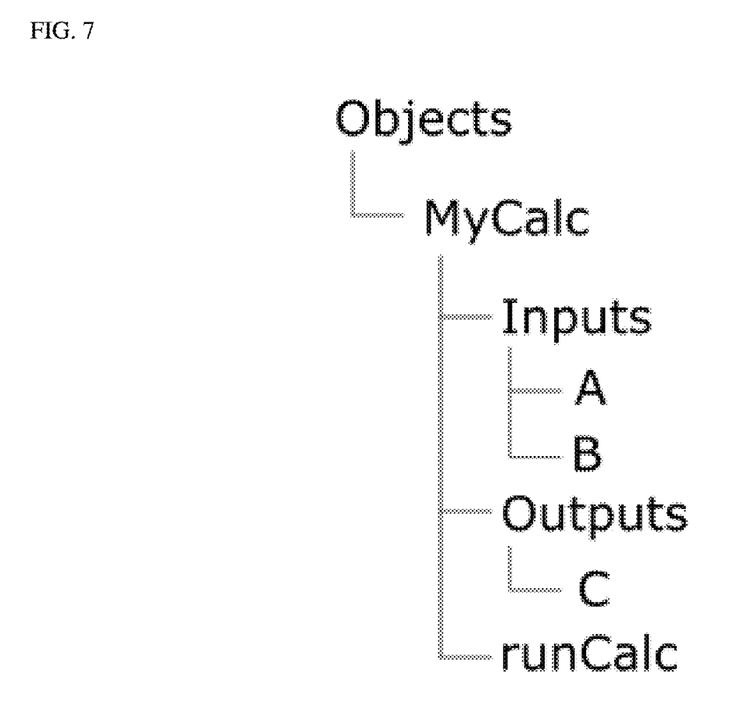
FIG. 7 shows an example of OPC UA nodes created in an address space of the OPC UA server according to one or more embodiments.

As a result, the OPC UA nodes of FIG. 7 are created in the address space in the memory 122. In the tree structure of FIG. 7, the OPC UA object node named "MyCalc" is created. The OPC UA child nodes named "Inputs," "Outputs," and "runCalc" are on the same hierarchical level under the OPC UA object node named "MyCalc."

Thus, according to one or more embodiments, the configuration file can be configured in the OPC UA server without compiling the configuration file because the interpreter 1202 runs the configuration file line-by-line.

(Modifying Configuration File)

Next, the method of modifying the configuration file will be described below.

Figure 8:
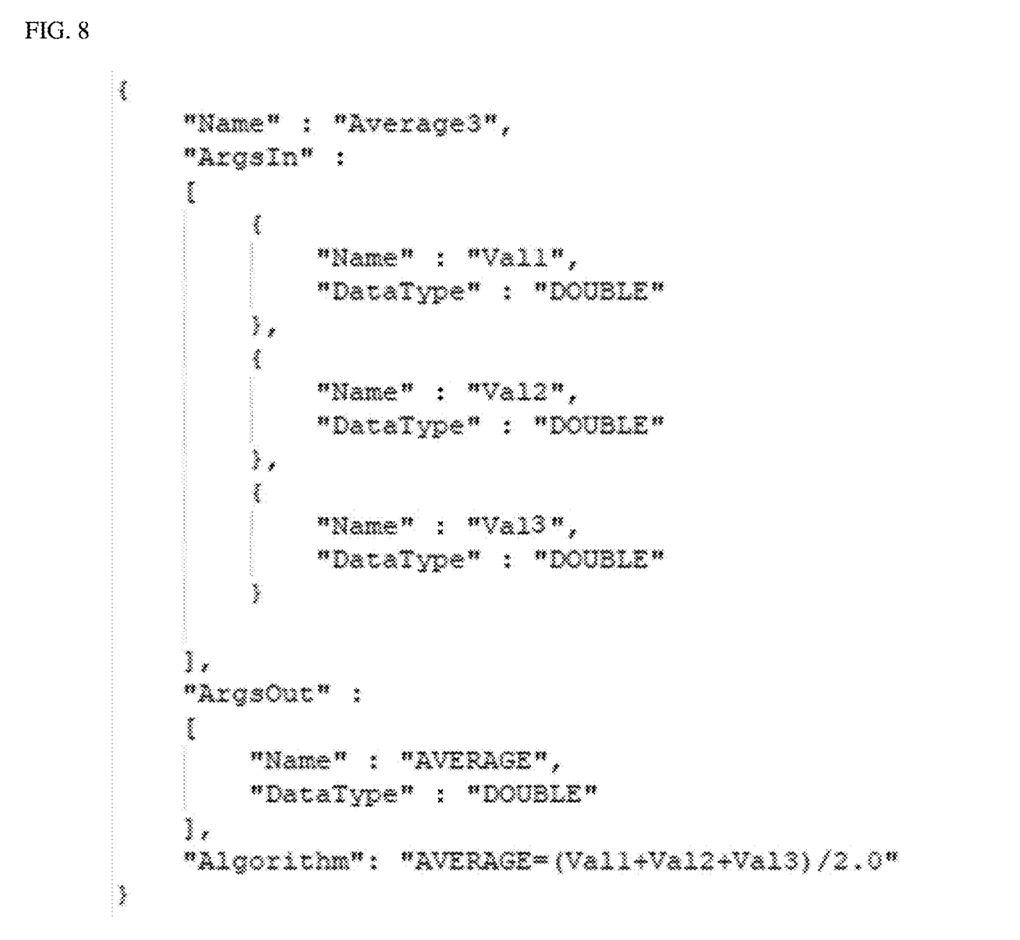
FIG. 8 shows an example of a configuration file according to one or more embodiments.
Figure 9:
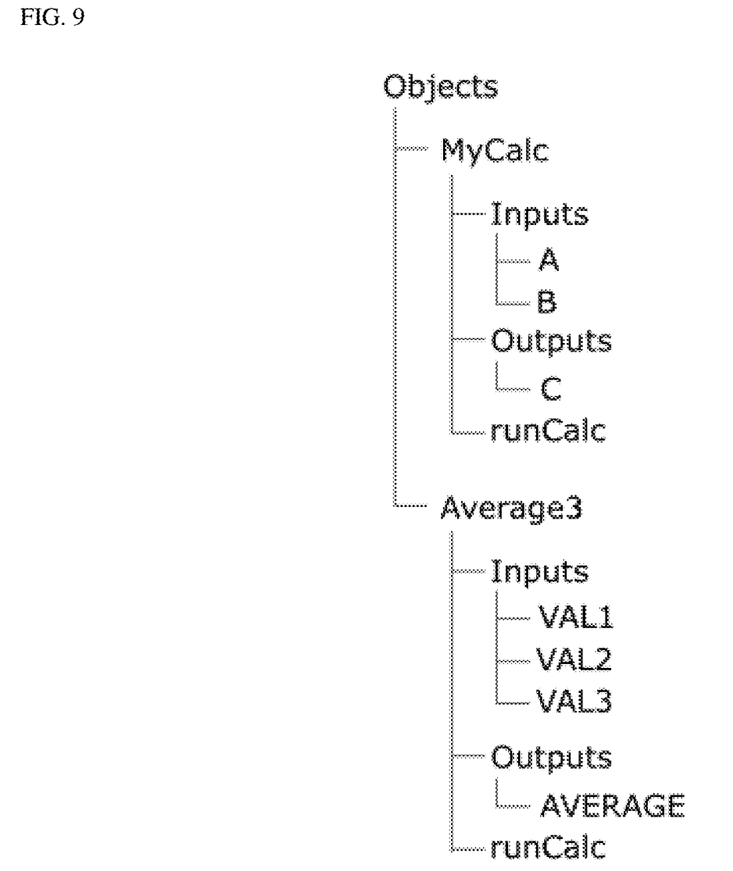
FIG. 9 shows an example of OPC UA nodes created in an address space of the OPC UA server according to one or more embodiments.

When the OPC UA server 120 receives the configuration file of FIG. 8 following the configuration file of FIG. 6, the OPC UA nodes as shown in FIG. 9 are created in the address space in the memory 122. In the OPC UA nodes of FIG. 9, the OPC UA object node named "Average3" is created in addition to the OPC UA object node named "MyCalc." The OPC UA child nodes named "Inputs," "Outputs," and "runCalc" are on the same hierarchical level under the OPC UA object node named "Average3." As shown in FIG. 8, in the "Algorithm" component, is set.

According to one or more embodiments, when part of the components in the configuration file, which has been already configured in the OPC UA server 120, is modified, the OPC UA client 110 sends the OPC UA server 120 a configuration file where part of components is modified.

Figure 10:
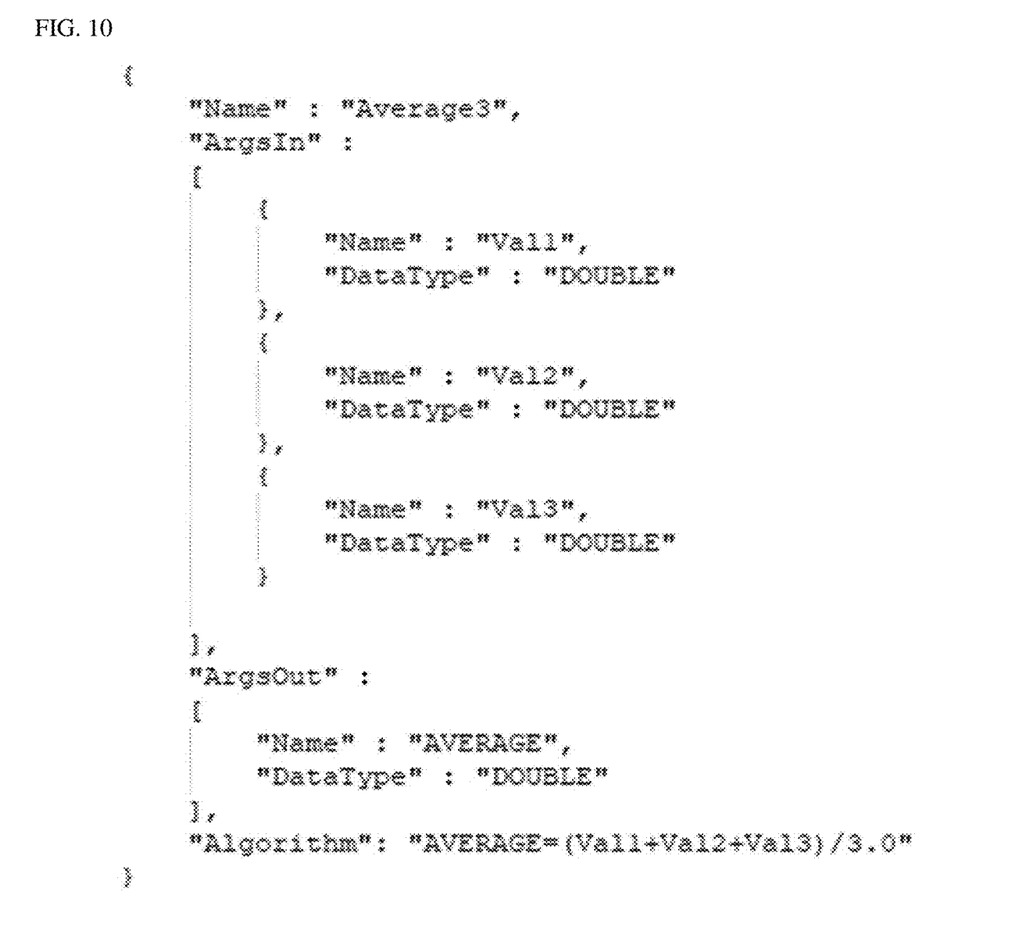
FIG. 10 shows an example of a configuration file according to one or more embodiments.

For example, when the "Algorithm" component "AVERAGE=(Va11+Va12+Va13)/2.0" in the configuration file of FIG. 8 is modified, the OPC UA client 110 sends the OPC UA server 120 a configuration file of FIG. 10 where "AVERAGE=(Va11+Va12+Va13)/3.0" is written in the "Algorithm" component. The remaining components other than the "Algorithm" component are the same between the configuration files of FIGS. 8 and 10.

When the configuration file is modified, the OPC UA server 120 operates following the procedures indicated in FIG. 5.

When the OPC UA server 120 receives the configuration file of FIG. 10 named "Average3" (S101 of FIG. 5), the OPC UA server 120 determines if the configuration file named "Average3" already exists on the storage 123 (S102).

Because the configuration file named "Average3" already exists on the storage 123 (yes at S102), the OPC UA server 120 deletes the existing OPC UA object node named "Average3" and child nodes of the OPC UA object node named "Average3" from the memory 122 (S103). The OPC UA server 120 deletes the existing configuration file named "Average3.txt" from the storage 123 (S103).

The OPC UA server 120 creates the OPC UA object node named "Average3" and child nodes of the OPC UA object node named "Average3" in the memory 122 using the configuration file of FIG. 10 (S104).

The OPC UA server 120 writes the "Algorithm" component being "AVERAGE=(Va11+Va12+Va13)/3.0" of FIG. 10 to the storage 123 under the OPC UA filename "Average3.txt" (S105).

Thus, by modifying only a component to be fixed in the configuration file, it is possible to flexibly fix the configuration file using the interpreter 1202.

According to one or more embodiments, even if an error is found in the exiting configuration file, the error can be fixed without compiling the configuration file because the interpreter 1202 executes the configuration file. As a result, it is flexible to modify or fix the configuration file because the user does not need to know complicated rules such as syntax rules of the compiled programing language to modify the configuration file.

(Running Calculation)

Figure 11:
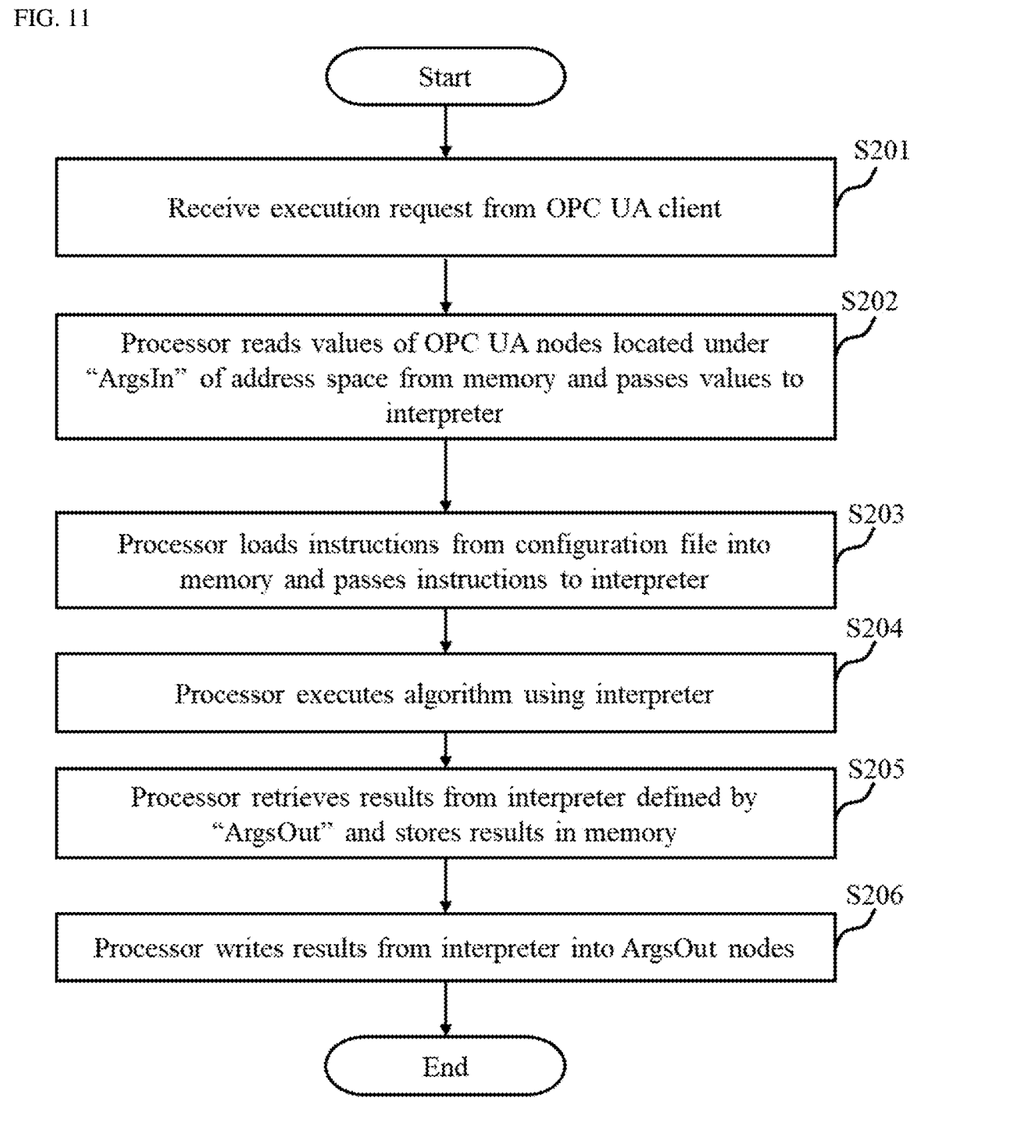
FIG. 11 shows a flowchart of executing a calculation in the OPC UA server according to one or more embodiments.

According to one or more embodiments, the OPC UA server 120 causes the interpreter 1202 to execute the calculation based on a request from the OPC UA client 110. FIG. 11 is a flowchart of running the calculation in the OPC UA server 120 according to one or more embodiments.

At step S201 of FIG. 11, the OPC UA server 120 receives an execution request to execute the calculation defined in the configuration file from the OPC UA client 110 via a network. The execution request includes a name for the calculation and values input by the user via the OPC UA client 110. In this example, the name for the calculation is "MyCalc" of FIG. 6 and the values "A" and "B" are "3" and "4", respectively. The processor 121 of the OPC UA server 120 writes the values of "3" and "4" to "A" and "B" in the memory 122, respectively.

At step S202, the processor 121 reads the values of the OPC UA nodes located under "ArgsIn" of the address space from the memory 122 and passes values to the interpreter 1202. In this example, the processor 121 reads the values of "3" and "4" corresponding to "A" and "B", respectively, and passes the values of "3" and "4" to the interpreter 1202.

At step S203, the processor 121 loads instructions from the configuration file into memory 122 and passes the instructions to the interpreter 1202. For example, the processor 121 loads the instructions defined for "MyCalc" ("C=A+B") from "MyCalc.txt" in the storage 123. Then, the processor 121 passes the instructions of "MyCalc.txt" to the interpreter 1202.

At step S204, the processor 121 executes the algorithm using the interpreter 1202 without compiling the configuration file. For example, the interpreter 1202 executes the calculation of "C=3+4."

At step S205, the processor 121 retrieves results from the interpreter 1202 defined by "ArgsOut" and stores the results in the memory 122. For example, the processor 121 stores the result of "7" obtained by the calculation in to the value named "C" in the memory 122.

At step S206, the processor 121 writes the results from the interpreter 1202 into ArgsOut nodes.

Thus, one or more embodiments provide a OPC UA system 1 including the OPC UA server 120 that is able to flexibly modify the configuration file used in the OPC UA system 1 and execute the calculation using the interpreter without compiling the configuration file.

In one or more embodiments, configuration files are not limited in the above examples indicated in FIGS. 6, 8, and 10. The configuration files may contain any source code that defines OPC UA application programs.

Although the disclosure has been described with respect to only a limited number of embodiments, those skilled in the art, having benefit of this disclosure, will appreciate that various other embodiments may be devised without departing from the scope. Accordingly, the scope of the invention should be limited only by the attached claims.

What is claimed is:

1. An Open Platform Communications (OPC) Unified Architecture (UA) server comprising:
   a storage that stores a configuration file written in a compiled programming language and in which an interpreter is embedded;
   a transceiver that receives, from an OPC UA client, an execution request to execute a calculation defined in the configuration file;
   a processor that executes the calculation using the interpreter; and
   a memory that stores OPC UA nodes created based on the configuration file, wherein
   the execution request comprises at least one value corresponding to at least one of the OPC UA nodes,
   the processor passes the at least one value to the interpreter upon receiving the execution request,
   the processor passes an instruction defined in the configuration file to the interpreter, and
   the processor causes the interpreter to execute an algorithm based on the instruction using the at least one value.

2. The OPC UA server according to claim 1, wherein the processor executes the calculation without compiling the configuration file.

3. The OPC UA server according to claim 1, wherein the configuration file is written in plaintext.

4. The OPC UA server according to claim 1, wherein the interpreter is a Lua engine.

5. A system that operates using Open Platform Communications (OPC) Unified Architecture (UA), the system comprising:
   an OPC UA server that stores a configuration file written in a compiled programming language and in which an interpreter is embedded; and
   an OPC UA client that sends the OPC UA server an execution request to execute a calculation defined in the OPC UA configuration file, wherein
   the OPC UA server executes the calculation using the interpreter upon receiving the execution request,
   the OPC UA server stores OPC UA nodes created based on the configuration file,
   the execution request comprises at least one value corresponding to at least one of the OPC UA nodes,
   the OPC UA server passes the at least one value to the interpreter upon receiving the execution request,
   the OPC UA server passes an instruction defined in the configuration file to the interpreter, and
   the OPC UA server causes the interpreter to execute an algorithm based on the instruction using the at least one value.

6. The system according to claim 5, wherein the OPC UA server executes the calculation without compiling the configuration file.

7. The system according to claim 5, wherein the configuration file is written in plaintext.

8. The system according to claim 5, wherein the interpreter is a Lua engine.

9. A method of executing an Open Platform Communications (OPC) Unified Architecture (UA) system, the method comprising:
   storing, with an OPC UA server, a configuration file written in a compiled programming language and in which an interpreter is embedded;
   sending, from an OPC UA client to the OPC UA server, an execution request to execute a calculation defined in the OPC UA configuration file;
   receiving, with the OPC UA server, the execution request; and
   executing, with the OPC UA server, the calculation using the interpreter upon receiving the execution request, wherein
   the storing further stores OPC UA nodes created based on the configuration file,
   the execution request comprises at least one value corresponding to at least one of the OPC UA nodes, and
   the method further comprising:
       passing, with the OPC UA server, the at least one value to the interpreter upon receiving the execution request;
       passing, with the OPC UA server, an instruction defined in the configuration file to the interpreter; and
       causing, with the OPC UA server, the interpreter to execute an algorithm based on the instruction using the at least one value.

10. The method according to claim 9, wherein the executing executes the calculation without compiling the configuration file.

11. The method according to claim 9, wherein the configuration file is written in plaintext.

12. The method according to claim 9, wherein the interpreter is a Lua engine.

* * * * *